United States Patent
Fujiwara (10) Patent No.: US 7,376,533 B2
(45) Date of Patent: May 20, 2008

(54) ELECTRONIC PEDOMETER

(75) Inventor: Toshiyuki Fujiwara, Chiba (JP)

(73) Assignee: Seiko Instruments Inc. (JP)

( * ) Notice: Subject to any disclaimer, the term of this patent is extended or adjusted under 35 U.S.C. 154(b) by 0 days.

(21) Appl. No.: 11/635,476

(22) Filed: Dec. 7, 2006

(65) Prior Publication Data

US 2007/0150229 A1    Jun. 28, 2007

(30) Foreign Application Priority Data

Dec. 28, 2005   (JP)   ............... 2005-378110

(51) Int. Cl.
*G01C 22/00*   (2006.01)
(52) U.S. Cl. .................................... 702/160
(58) Field of Classification Search ........... 702/78, 702/79, 82, 91, 92, 93, 94, 95, 104, 116, 141, 702/150, 151, 154, 160; 324/522; 73/514.33, 73/514.34
See application file for complete search history.

(56) References Cited

U.S. PATENT DOCUMENTS 6,254,513 B1 *   7/2001   Takenaka et al. .............. 482/3

2002/0089425 A1 *   7/2002   Kubo et al. ............... 340/573.1
2004/0243342 A1 *   12/2004   Rekimoto .................... 702/150
2005/0222802 A1 *   10/2005   Tamura et al. .............. 702/150

FOREIGN PATENT DOCUMENTS

| GB | 2413633 | 2/2005 |
| JP | 2004054704 | 7/2002 |
| JP | 2004125551 | 10/2002 |

* cited by examiner

*Primary Examiner*—Edward Raymond
*Assistant Examiner*—Mohamed Charioui
(74) *Attorney, Agent, or Firm*—Adams & Wilks (57) ABSTRACT

To provide an electronic pedometer in which there is adapted such that a step number is counted by a walk motion of a user, and the step number is not counted by a motion other than a walk of the user. An electronic pedometer has a timepiece case, a signal processing part having been accommodated in the timepiece case, and an acceleration sensor and a slant sensor, which have been accommodated while holding their horizontal states. The signal processing part judges, in a case where the slant sensor has outputted a horizontality signal, whether or not an acceleration signal, that the slant sensor has generated in a horizontality time till a time at which it has thereafter outputted a slant signal, is a true walk signal, when there has been judged to be the true walk signal, it performs a walk addition and, when there has been judged not to be the true walk signal, it performs a signal processing so as not to perform the walk addition.

5 Claims, 6 Drawing Sheets

FIG. 7

ELECTRONIC PEDOMETER

BACKGROUND OF THE INVENTION

1. Field of the Invention

The present invention relates to an electronic pedometer which has an acceleration sensor as a walk sensor, and which is attached to an arm of a user by a band.

2. Description of the Prior Art

An electronic pedometer disclosed in JP-A-2005-309693 has an acceleration sensor as a walk sensor outputting a walk signal corresponding to a walk by detecting the walk of a user, a step number calculation means calculating a step number of the user on the basis of the walk signal, and a belt for attaching the acceleration sensor to a wrist of the user. The acceleration sensor is disposed in an electronic pedometer case such that its sensitivity shaft is located in a predetermined angle range with respect to a longitudinal direction of the belt. The "predetermined angle range" means that the sensitivity shaft of the acceleration sensor exists in a range from 90 degrees to less than 30 degrees counterclockwise with respect to the longitudinal direction of the belt, or a range from 90 degrees to less than 30 degrees clockwise with respect to the longitudinal direction of the belt.

The above conventional electronic pedometer has such an advantage that also a walk, performed without swinging the arm can be detected needless to say about a case where the user normally walks or runs.

However, not limited to the above conventional electronic pedometer, the electronic pedometer having the acceleration sensor as the walk sensor has a problem that a false step number is counted in a case where the user has moved only the arm without walking. Such a case is a case where the user is engaged in desk work such as personal computer work, a case where the user turns a page of a book, or the like.

That is, in the case where the user, who has worn the electronic pedometer having possessed the acceleration sensor, is engaged in a desk work such as personal computer work, the acceleration sensor detects a vibration of the wrist and outputs an acceleration signal. Whereupon, it follows that the electronic pedometer counts the acceleration signal as the step number. In other words, in the electronic pedometer having possessed the acceleration sensor, there is a problem that, if the electronic pedometer outputs the acceleration signal also by a motion of the user other than the walk, the step number is counted, so that the step number larger than a real step number is recorded and displayed.

A problem that the invention is to solve is to make such that, in the electronic pedometer having possessed the acceleration sensor, the acceleration signal having been generated by the motion of the user other than the walk is not counted as the step number.

SUMMARY OF THE INVENTION

In order to solve the above problem, there has been paid attention to the fact that the electronic pedometer is slanted at a walk time, and held generally in a horizontal state at a time other than the walk.

In order to solve the above problem, an electronic pedometer of the invention has an acceleration sensor for generating an acceleration signal corresponding to a motion of a user accompanying an acceleration, a slant sensor for discriminating a horizontality degree, a signal processing part for determining a step number of the user from the acceleration sensor and the slant sensor, a case containing the signal processing part and accommodating the acceleration sensor and the slant sensor, and a belt or band for attaching the case to a wrist of the user, and is characterized in that, in a case where a slant signal has been outputted from the slant sensor, the signal processing part step-number-counts the acceleration signal as a walk signal. And, there may be adapted such that, in a case where a horizontality signal has been outputted from the slant sensor, the signal processing part does not step-number-count the acceleration signal as the walk signal.

The slant sensor outputs a directional slant signal showing the fact that it has slanted in at least one direction having been optionally selected and, in a case where the slant sensor has outputted the directional slant signal, the signal processing part may make the directional slant signal into the slant signal. For example, in a case where 12 o'clock direction and 3 o'clock direction of the electronic pedometer are made directions in which a slant of the slant sensor is detected, there is adapted such that, when there has been detected that the electronic pedometer has slanted in any one direction of 12 o'clock direction or 3 o'clock direction, the signal processing part recognizes this directional slant signal as the slant signal.

Further, in order to solve the above problem, there has been adapted such that the signal processing part temporarily stops, when the slant sensor has outputted a horizontality signal, a count, as a step number, of the acceleration signal of the acceleration sensor, and there is performed a horizontality time count processing which performs a count of the acceleration signal. And, there has been adapted such that, thereafter when the slant sensor has outputted the slant signal, the horizontality time count processing is released, it is shifted to a step number count, there is evaluated a horizontality time count value having been counted in the horizontality time count processing and, in a case where there has been judged to be an accumulated value of the acceleration signal by a true walk, the horizontality time count value is added to the step number count.

There may be adapted such that the evaluation of the horizontality time count value is performed by comparing a step number count value just before a horizontality time count time or a step number count value just after the same, or a step number count value just before and just after the same with the horizontality time count value. Further, there may be adapted such that the evaluation of the horizontality time count value is performed by comparing a step number pitch just before the horizontality time count time or a step number pitch just after the same, or a step number pitch just before and just after the same with a horizontality time count value per unit time of the horizontality time count value. And, there may be adapted such that the evaluation of the horizontality time count value is performed by comparing a previously set walk pitch with a horizontality time count value per minute unit of the horizontality time count value.

BRIEF DESCRIPTION OF THE SEVERAL VIEWS OF THE DRAWINGS

A preferred form of the present invention is illustrated in the accompanying drawings in which.

DETAILED DESCRIPTION OF THE PREFERRED EMBODIMENTS

In an electronic pedometer concerned with the invention, there has been adapted such that there is disposed a slant sensor detecting whether or not the electronic pedometer is in a slant state and, when the slant sensor has outputted a horizontality signal, an acceleration signal of an acceleration sensor is not counted as a step number. And, it is one having been adapted such that, when the slant sensor has outputted a slant signal, it is shifted to a step number count.

Figure 1:
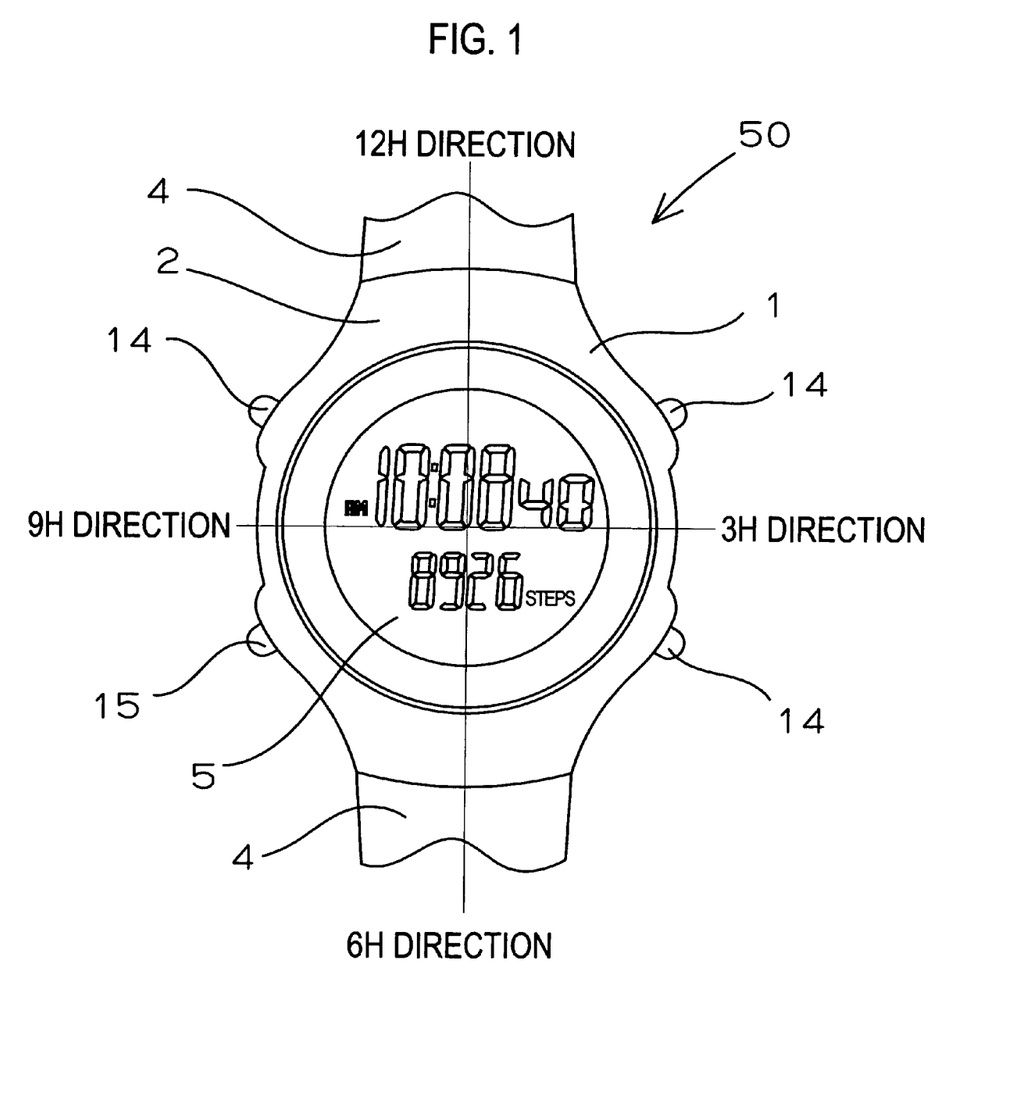
FIG. 1 is a plan view of a main part of an electronic pedometer of an embodiment 1 and an embodiment 2.
Figure 2:
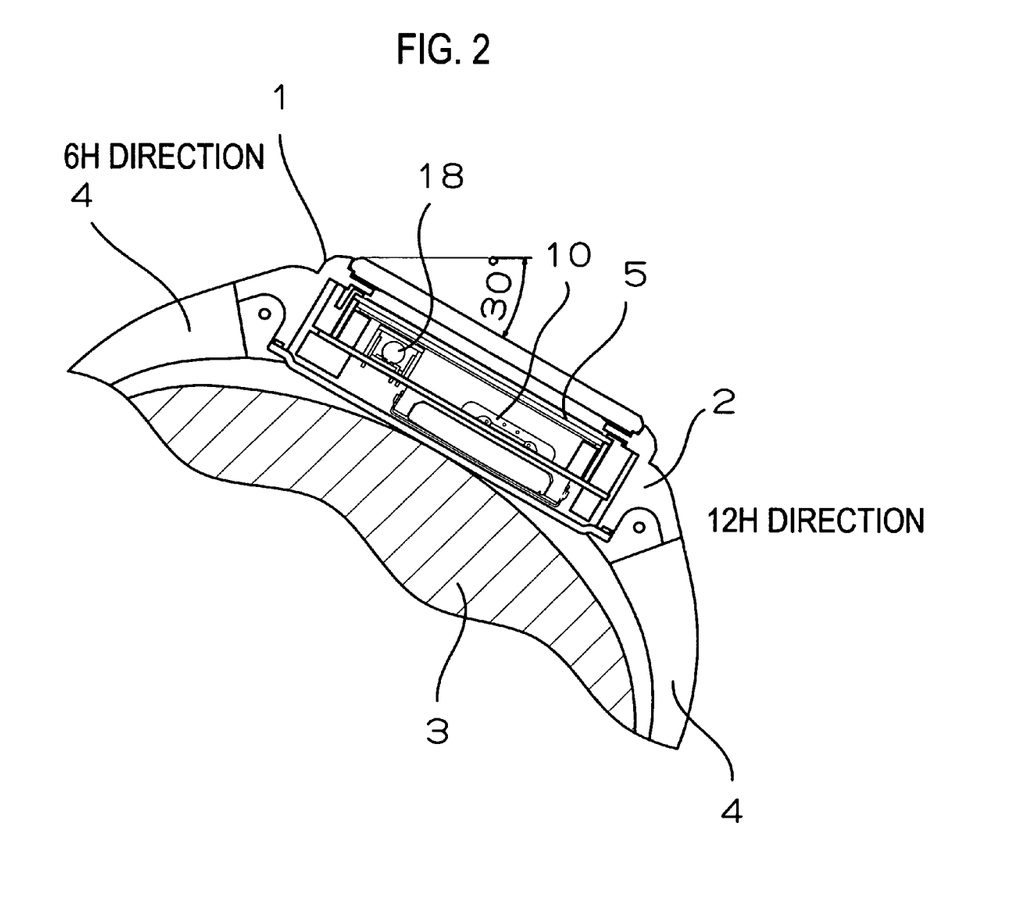
FIG. 2 is a sectional view of the main part of the electronic pedometer of the embodiment 1 and the embodiment 2, which has been shown under a state that it has been worn to an arm of a user.
Figure 4:
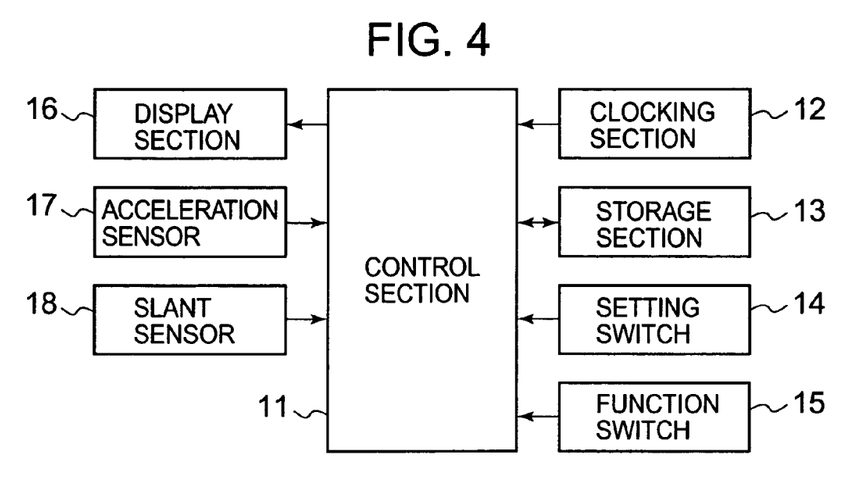
FIG. 4 is a block circuit diagram of; the electronic pedometer of the embodiment 1 and the embodiment 2.

As shown in FIG. 1 which is a plan view of a main part, FIG. 2 which is a sectional view of a main part having been shown under a state having been worn to an arm 3 of a user, and FIG. 4 of a block circuit, an electronic pedometer 50 of one embodiment of the invention is one having been constituted by adding a pedometer function to an electronic timepiece, and is an electronic pedometer in which a timepiece band 4 has been attached to a timepiece main body 1.

The timepiece main body 1 has a timepiece case 2, a signal processing part 10 accommodated in the timepiece case 2, an acceleration sensor 17, and a slant sensor 18. The acceleration sensor 17 senses a swing of an arm during a walk of the user and a vibration exerted on the arm at a walk time, as a change in acceleration. When the electronic pedometer 50 has been slanted to a previously set (preset) angle, the slant sensor 18 outputs a slant signal showing the fact that it has been slanted. To the timepiece case 2 there is attached in its opening part a liquid crystal display panel 5, and to its side face there are attached a setting switch 14 and a function switch 15. The acceleration sensor 17 and the slant sensor 18 are accommodated in the timepiece case 2 while holding their horizontal states. To a 12 o'clock side and a 6 o'clock side of the timepiece case 2, there is attached a band 4 for wearing the electronic pedometer 50 to the arm 3.

As shown in FIG. 4, the signal processing part 10 accommodated in the timepiece case 2 is constituted by a control section 11, a clocking section 12 for dividing an oscillation frequency of a quartz oscillator to produce a time base signal, a storage section 13 for storing a control program and other data, a setting switch 14 for setting the current time and the like, a function switch 15 for performing a switching and the like of a current time mode, a step number measurement mode and the like, and a display section 16 for displaying the current time, a step number and the like. The liquid crystal display panel 5 is one constituting one part of the display section 16.

Figure 5:
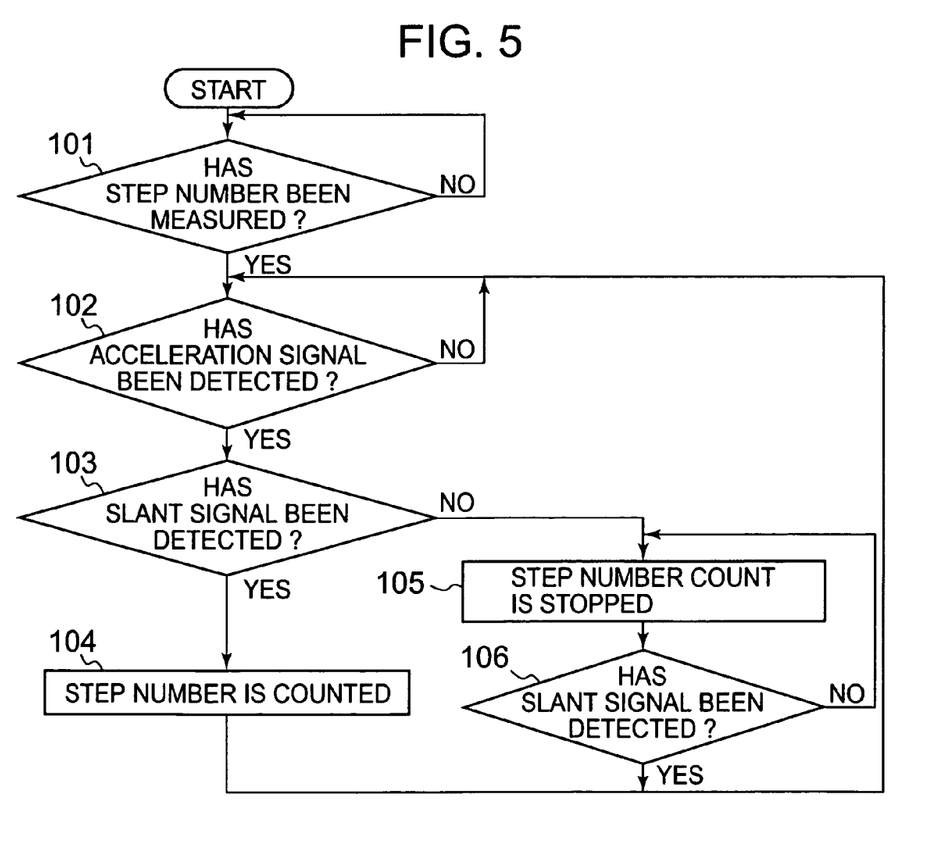
FIG. 5 is a flowchart showing a flow of signal processing of the electronic pedometer of the embodiment 1.

The electronic pedometer of the embodiment 1 of the invention, which has been constituted as mentioned above, operates in compliance with such a processing flow as shown in FIG. 5.

The control section 11 first judges whether or not the electronic pedometer is the step number measurement mode (101). In the step 101, if it is judged to be the step number measurement mode, the control section 11 detects an existence/nonexistence of an input of an acceleration signal from the acceleration sensor 17 (102). If the input of the acceleration signal is detected in the step 102, the control section 11 judges whether or not the electronic pedometer is in a slant state on the basis of an output signal of the slant sensor 18 (103). In a case where the slant sensor 18 is outputting a slant signal, the control section 11 performs a step number count with the acceleration signal being made a step number signal (104), and it returns to the initial step 102.

In the step 103, in a case where the slant sensor 18 has outputted a horizontality signal, the control section 11 performs a stop of the step number count of the acceleration signal (105). Thereafter, when the control section 11 has detected the fact that the slant signal of the slant sensor 18 has been outputted (106), the stop of the step number count is finished, and the processing flow returns to the initial step 102.

Figure 7:
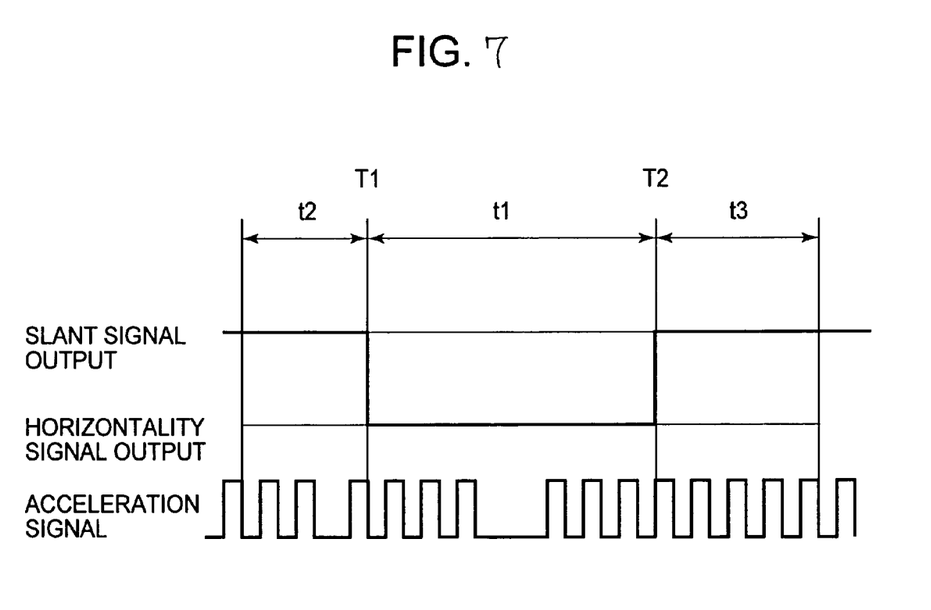
FIG. 7 is a view showing one example of output waveforms of an acceleration signal of an acceleration sensor, and a slant signal and a horizontality signal of a slant sensor in the electronic pedometer concerned with the invention.

For example, in a case where output waveforms of the acceleration signal of the acceleration sensor 17, and the slant signal and the horizontality signal of the slant sensor 18 have been such ones as shown in FIG. 7, it follows that the electronic pedometer of the embodiment 1 stops the step number count at a time instant $T_1$ (105), the slant signal is detected at a time instant $T_2$ (106), and the stop of the step number count is finished.

As shown in FIG. 1 which is the plan view of the main part, FIG. 2 which is the sectional view of the main part having been shown under the state having been worn to the arm 3 of the user, and FIG. 4 of the block circuit, an electronic pedometer of the embodiment 2 of the invention is one having been constituted by adding the pedometer function'to the electronic timepiece, and is an electronic timepiece with a step number measurement function, in which the timepiece band 4 has been attached to the timepiece main body 1.

The timepiece main body 1 has the timepiece case 2, the signal processing part 10 accommodated in the timepiece case 2, the acceleration sensor 17, and the slant sensor 18. The acceleration sensor 17 senses the swing of the arm during the walk of the user and the vibration exerted on the arm at the walk time, as the change in acceleration. When the electronic pedometer 50 has been slanted to the previously set angle, the slant sensor 18 outputs the slant signal showing the fact that it has been slanted. To the timepiece case 2 there is attached in its opening part the liquid crystal display panel 5, and to its side face there are attached the setting switch 14 and the function switch 15. The acceleration sensor 17 and the slant sensor 18 are accommodated in the timepiece case 2 while holding their horizontal states. To the 12 o'clock side and the 6 o'clock side of the timepiece case 2, there is attached the band 4 for wearing the electronic pedometer 50 to the arm 3.

As shown in FIG. 4, the signal processing part 10 accommodated in the timepiece case 2 is constituted by the control section 11, the clocking section 12 for dividing the oscillation frequency of the quartz oscillator to produce a time base signal, the storage section 13 for storing the control program and other data, the setting switch 14 for setting the current time and the like, the function switch 15 for performing the switching and the like of the current time mode, the step number measurement mode and the like, and the display section 16 for displaying the current time, the step number and the like. The liquid crystal display panel 5 is one constituting one part of the display section 16.

Figure 6:
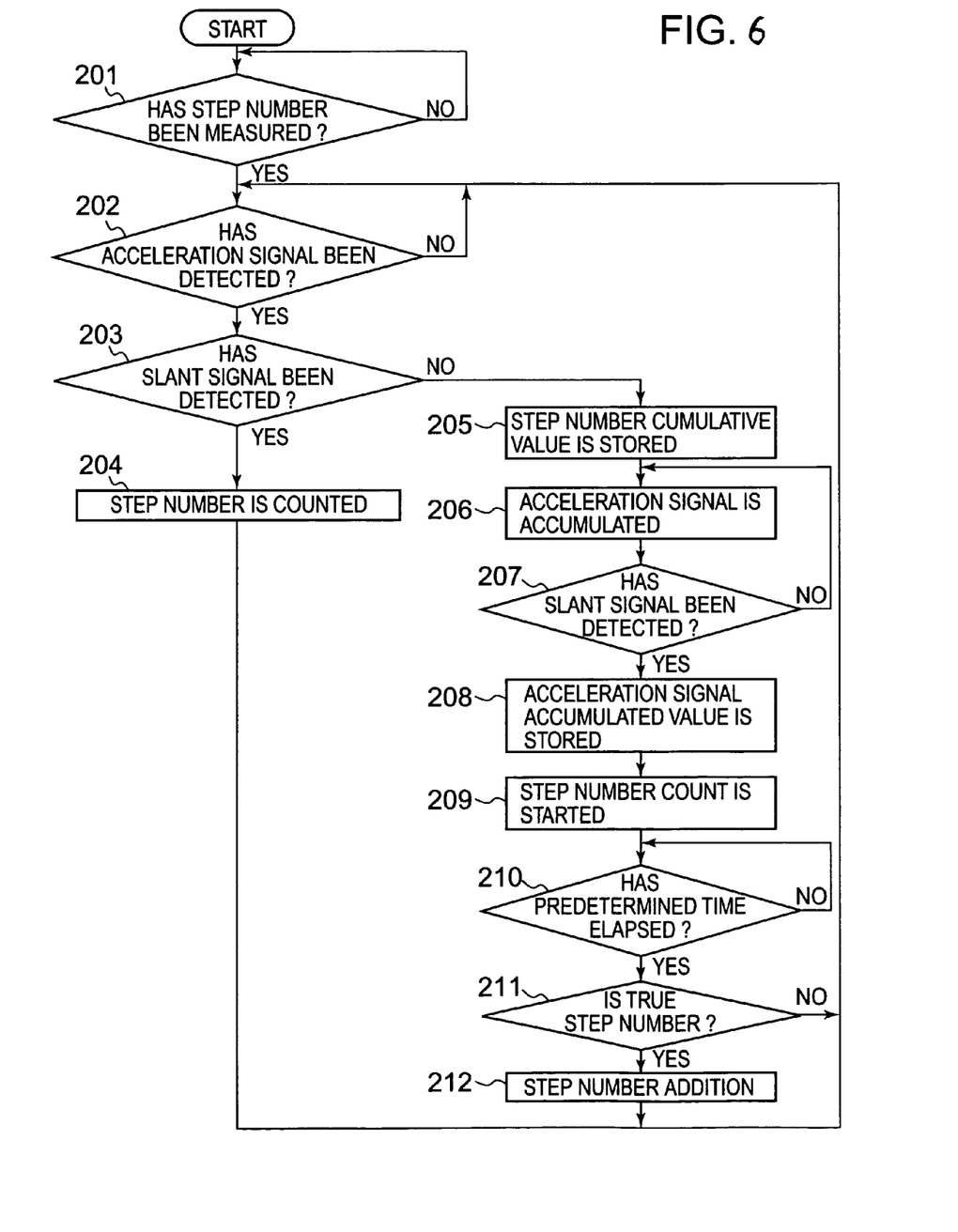
FIG. 6 is a flowchart showing a flow of signal processing of the electronic pedometer of the embodiment 2.

The electronic pedometer of the embodiment 2 of the invention, which has been constituted as mentioned above, operates in compliance with such a processing flow as shown in FIG. 6.

The control section 11 first judges whether or not the electronic pedometer is the step number measurement mode (201). In the step 201, if it is judged to be the step number measurement mode, the control section 11 detects an existence/nonexistence of the input of the acceleration signal from the acceleration sensor 17 (202). If the input of the acceleration signal is detected in the step 202, the control section 11 judges whether or not the electronic pedometer is in the slant state on the basis of the output signal of the slant sensor 18 (203). In the case where the slant sensor 18 is outputting the slant signal, the control section 11 performs the step number count with the acceleration signal being made the step number signal (204), and it returns to the initial step 202.

In the step 203, in the case where the slant sensor 18 has outputted a horizontality signal, the control section 11 performs a horizontality time count processing along a flow from the following step 205 to step 210. That is, if the control section 11 detects the horizontality signal, it stores a step number cumulative value till at that point of time to the storage section 13 (205) and, from that point of time, performs a horizontality time count of the acceleration signal (206). Thereafter, if there is detected the fact that the slant sensor 18 has outputted the slant signal (207), the control section 11 finishes the horizontality time count, stores a horizontality time count value, which is an accumulated value of the acceleration signal having been counted in a horizontality time count time, to the storage section 13 (208), and shifts it to a normal step number count (209). The normal step number count is one in which the step number by the acceleration signal after the point of time of the step 209 is counted to the step number cumulative value having been stored to the storage section 13 in the step 205.

Subsequent to the step 209, the control section 11 judges whether or not a predetermined time has elapsed (210) and, if a judgment result is YES, performs a judgment processing as to whether or not the horizontality time count value is added to a step number count value (211). If a judgment result of the step 211 is YES, i.e., in a case where there has been judged that it is an accumulated value of the acceleration signal by a true walk, the horizontality time count value is added to the step number count value, and it returns to the step 202. Reversely, if the judgment result of the step 211 is NO, since it is not the accumulated value of the acceleration signal by the true walk but the accumulated value of the false acceleration signal, it is not added to the step number count value, so that it returns to the step 202. Incidentally, although the predetermined time is optionally determined, it may be, e.g., for five minutes.

The judgment processing in the step 211, i.e., the judgement processing as to whether or not the horizontality time count value is added to the step number count, in other words, as to whether or not the horizontality time count value is the accumulated value of the acceleration signal by the true walk, is performed as follows.

A first concrete processing method is a method in which a step number count value for comparison and the horizontality time count value are compared and, in a case where there is no remarkable difference between both, there is judged to be the accumulated value of the acceleration signal by the true walk. The step number count value for comparison is, e.g., a step number count value of the same time interval as a horizontality time count processing time interval, and is a step number count value just before a horizontality time count processing. Or, in a case where the predetermined time in the step 209 has been made the same as the horizontality time count processing time interval or longer than the same, the step number count value for comparison is a step number count value of the same time interval as the horizontality time count processing time interval, and is a step number count value just after the horizontality time count processing. Additionally, the step number count value for comparison may be made both of a step number count value just before the horizontality time count processing and the step number count value just after the horizontality time count processing.

A second concrete processing method is a method in which a step number pitch for comparison and a mean horizontality time count value per minute unit are compared and, in a case where there is no remarkable difference between both, there is judged to be the accumulated value of the acceleration signal by the true walk. The step number pitch for comparison is a step number pitch just before the horizontality time count processing or a step number pitch just after the horizontality time count processing, or both of a step number pitch before the horizontality time count processing and a step number pitch after the horizontality time count processing. A mean horizontality time count value per unit time is a value having been obtained by dividing an acceleration signal accumulated value having been stored in the step 208 by a horizontality time count processing time. Further, the step number pitch is one obtained by the fact that the control section 11 performs an operation processing in compliance with a step number pitch calculation program stored in the storage section 13.

Additionally, a third concrete processing method is a method in which a step number pitch for comparison and a mean horizontality time count value per minute unit are compared and, in a case where there is no remarkable difference between both, there is judged to be the accumulated value of the acceleration signal by the true walk, wherein the step number pitch for comparison has been made a standard step number pitch having been previously set. And, the standard step number pitch is one previously stored in the storage section 13. Or, there may be adapted such that a minimum walk pitch peculiar to a user is set by the setting switch 14, and previously stored to the storage section 13.

In a case where, during the walk, the user has placed the electronic pedometer in a horizontal state by bending the arm in order to confirm the step number or the current time, since the mean horizontality time count value per minute unit has a remarkable difference from the user's walk pitch per minute unit, the judgment result of the step 211 is NO, i.e., the horizontality time count value is the accumulated value of the acceleration signal having been generated by the user's motion other than the walk, so that there becomes a judgment to the effect that it is not the accumulated value of the acceleration signal by the true walk. In the step 211, if there is made the judgment to the effect that it is not the accumulated value of the acceleration signal by the true walk, in other words, if there is made a judgment to the effect that it is the false walk signal, since it immediately returns to the initial step 202, the horizontality time count value in this case is never added to a walk count.

Incidentally, supposing that a user's minimum walk pitch is 60 to 80 steps/minute, there may be adapted such that, when a value below this value has been detected, there is judged that it is not a walk state because it does not reach the minimum walk pitch.

Further, in the case where, during the walk, the user has placed the electronic pedometer in the horizontal state by bending the arm in order to confirm the step number or the current time, the mean horizontality time count value per minute unit scarcely differs from the user's walk pitch. Accordingly, since no remarkable difference can be seen between the mean horizontality time count value and the step number pitch for comparison, the judgement result of the step 211 is YES, i.e., there becomes a judgement to the effect that it is the accumulated value of the acceleration signal of the true walk, and the horizontality time count value is added to the step number count value (212) and it returns to the step 202.

For example, in the case where output waveforms of the acceleration signal of the acceleration sensor 17, and the slant signal and the horizontality signal of the slant sensor 18 have been such ones as shown in FIG. 7, the electronic pedometer of the embodiment 2 stops the step number count at the time instant $T_1$, stores the step number cumulative value till that point of time to the storage section 13 (205), and performs the horizontality time count of the acceleration signal from that point of time (206). At the point of time $T_2$, there is detected the fact that the slant sensor 18 has outputted the slant signal (207), the control section 11 finishes the horizontality time count, stores the horizontality time count value, which is the accumulated value of the acceleration signal having been counted in a horizontality time count time $t_1$, to the storage section 13 (208), and shifts it to the normal step number count (209).

And, it follows that an evaluation as to whether or not the horizontality time count value, which is the accumulated value of the acceleration signal having been counted in the horizontality time count time $t_1$, is the true walk signal is performed in compliance with the above-mentioned first to third concrete processing methods by utilizing the acceleration signal having been counted in the time $t_1$ before than the time instant $T_1$ and the acceleration signal having been counted in the time $t_3$ after than the time instant $T_2$. In FIG. 7, since the acceleration signal having been generated in the horizontality time count time $t_1$ has the same periodicity as the acceleration signal at the walk time, it follows that the above horizontality time count value is judged to be the true walk signal and step-number-added (212).

As mentioned above, the electronic pedometer concerned with the invention can count an accurate step number not only in the case where the acceleration signal has been generated by the user's motion other than the walk, but also in the case where, during the walk, the user has placed the electronic pedometer in the horizontal state by bending the arm in order to confirm the step number or the current time. In short, this is because the electronic pedometer concerned with the invention is one which has been constituted such that the acceleration signal having been generated by the motion other than the user's walk is not counted as the step number.

By the way, the slant sensor 18 having been adopted in the embodiment is such a slant switch as disclosed in JP-A-2001-110292. The slant switch disclosed in the above Patent document is one comprising a box type case whose upper face is open, a common contact having been disposed in an inner bottom face of the case, a fixed contact having been disposed respectively in inner side faces in four directions of the case, an electrically conductive bulb rotatably accommodated in the case and contacting with and separating from the common contact and the fixed contact, and a cover covering an open part of the case upper face However, the slant sensor 18 may be one of whatever structure if it is one which outputs the horizontality signal when the electronic pedometer exists in a predetermined angle range, and outputs the slant signal when it has slanted while exceeding the predetermined angle range. In the present embodiment, although the predetermined angle range has been made 30 degrees with respect to the horizontal shaft, it is of course that it may be an angle range commonsensically recognized as the horizontal state.

Figure 3:
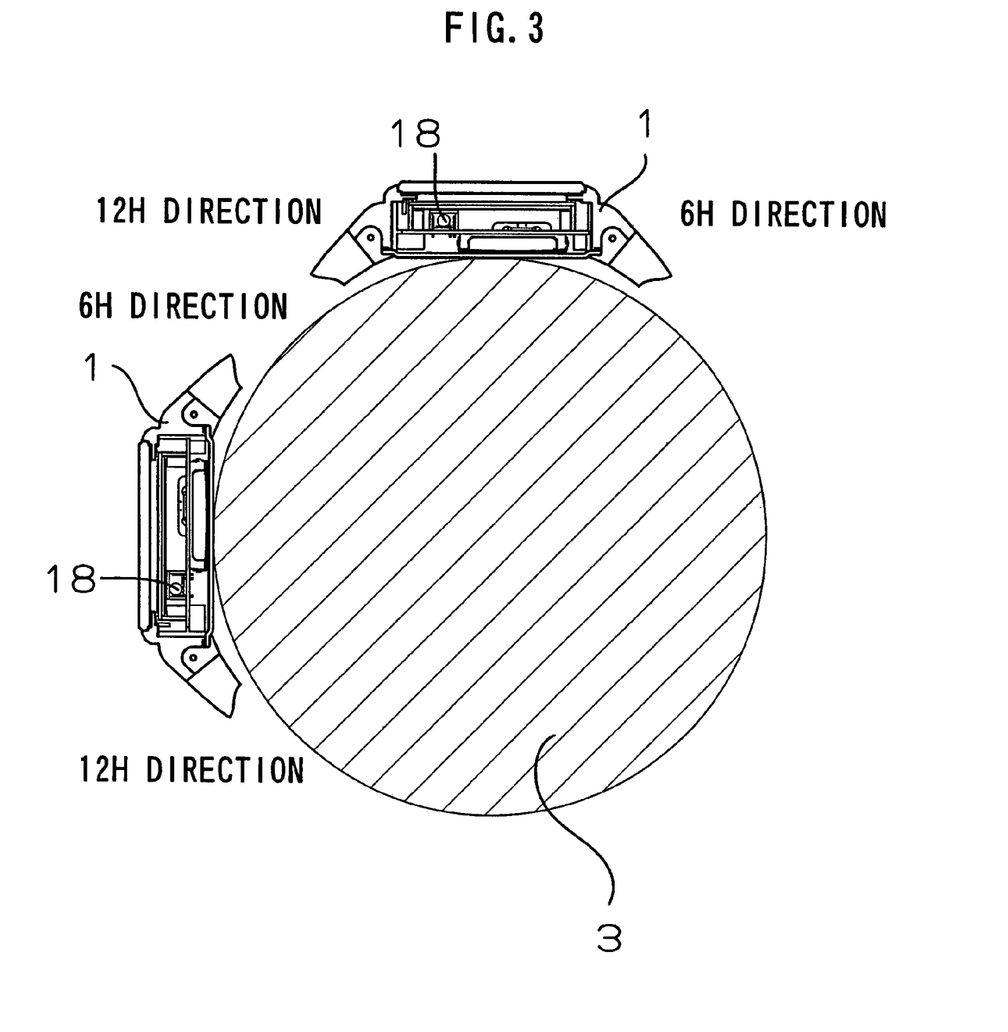
FIG. 3 is a sectional view of the main part of the electronic pedometer of the embodiment 1 and the embodiment 2, which has been shown under the state that it has been worn to the arm of the user, showing a case where the electronic pedometer is held under a horizontal state, and a case where the electronic pedometer is held under a slant state.

By using the slant sensor 18 of a structure outputting four slant signals while corresponding to the four fixed contacts having been disposed respectively in inner side faces in four directions of length and width of the box type case whose upper face is open, if the slant sensor 18 is disposed in the timepiece case 2 while coinciding the four fixed contacts with directions of 12 o'clock, 3 o'clock, 6 o'clock and 9 o'clock, it is possible to detect a slant direction of the electronic pedometer concerned with the invention. In this connection, FIG. 3 shows a case where the electronic pedometer is held in the horizontal state, and a case where the electronic pedometer is held in the slant state. Thereupon, by using the slant sensor 18 having a directional property like this in the electronic pedometer of the invention, there can be also made so as to perform the processing of the acceleration signal of the acceleration sensor with only the slant in the specified direction being made a walk motion and with the slant other than that being made one due to the motion other than the walk.

Generally, in the swing of the arm during the walk, since a surface of the timepiece case 2 is in such a vertical state as shown in FIG. 3, there is no fact that the slant sensor 18 outputs the horizontality signal. However, in the case where the user has placed the electronic pedometer in the horizontal state by bending the arm in order to confirm the step number or the current time, it follows that the slant sensor 18 outputs the horizontality signal. In other words, it outputs the horizontality signal during the normal walk. If the horizontality signal is outputted, it follows that the electronic pedometer concerned with the invention performs the horizontality time count processing of the step 206. However, the horizontality signal outputted by the arm swing at the normal walk time is one of a signal having the periodicity corresponding to the walk pitch.

Thereupon, in a case where the horizontality signal of the slant sensor 18 is the signal having the periodicity corresponding to the walk pitch generating at the normal walk time, it is also possible to make so as not to perform the above-mentioned horizontality time count processing of the step 206. A first method is a method in which there is adopted, e.g., the slant sensor 18 outputting the slant signal corresponding in four directions in length and width, i.e., the slant sensor 18 outputting a directional slant signal, and, in a case where the slant signal in a specified direction, e.g., the slant signal in 12 o'clock direction, and the horizontality signal are generated repeatedly, the horizontality signal is processed as the false horizontality signal. A second method is a method in which a repetition period of the slant signal and the horizontality signal is detected, and this and the stored step number pitch are compared. According to the second method, it suffices if the slant sensor 18 is one capable of detecting whether it slants in 12 o'clock direction or other than it. In other words, it is possible to use the slant sensor 18 outputting the slant signal when slanting in 12 o'clock direction by a predetermined angle range. In a case slanting in a direction other than 12 o'clock direction, the user judges that it is performing the motion other than the direction. The slant sensor 18 capable of being adopted is various such as one-directional slant sensor, two-directional slant sensor, three-directional slant sensor, and four-directional slant sensor. Accordingly, it follows that, in the electronic pedometer concerned with the invention, as to the signal processing in each of a primary stop of the step number count, the horizontality time count processing of the acceleration signal at a primary stop time, and the addition processing of the horizontality time count value to the walk count, an optimum method is selected while corresponding to a kind of the slant sensor 18.

By the invention, although the electronic pedometer step-number-counts the acceleration signal occurring by the walk motion of the user who has worn it to the wrist by the wearing band, since it prevents the count of the acceleration signal occurring by the motion other than the walk, it has become possible to record an accurate step number.

Further, in the electronic pedometer concerned with the invention, since a component to be added is only the slant sensor and a change in signal processing program is additional one, a large increase in cost for an implementation could be suppressed.

What is claimed is:

1. An electronic pedometer comprising:
   a case;
   a band connected to the case to enable the case to be worn on the wrist of a user;
   an acceleration sensor mounted in the case and that generates an acceleration signal in response to acceleration of the wrist-worn case;
   a slant sensor mounted in the case and that discriminates a horizontality degree of the wrist-worn case and outputs a slant signal when the degree of horizonality is equal to or greater than a preset angle and outputs a horizontality signal when the degree of horizontality is less than the preset angle and
   a signal processing part mounted in the case and that step-number-counts the acceleration signal as a walk signal when the slant signal is outputted from the slant sensor, that temporarily stops, when the slant sensor has outputted a horizontality signal, a step number count of the acceleration signal of the acceleration sensor to thereby perform a horizontality time count processing of the acceleration signal, that finishes, when thereafter the slant sensor has outputted the slant signal, the horizontality time count processing to thereby shift it to a step number count and evaluates a horizontality time count value having been obtained in the horizontality time count processing and that, in a case where there has been judged to be an accumulated value of the acceleration signal by a true walk, adds the horizontality time count value to the step number count.

2. An electronic pedometer according to claim 1, wherein the evaluation of the horizontality time count value is performed by comparing a step number count value just before a horizontality time count time or a step number count value just after the same, or a step number count value just before and just after the same with the horizontality time count value.

3. An electronic pedometer according to claim 1, wherein the evaluation of the horizontality time count value is performed by comparing a step number pitch just before the horizontality time count time or a step number pitch just after the same, or a step number pitch just before and just after the same with a horizontality time count value per unit time of the horizontality time count value.

4. An electronic pedometer according to claim 1, wherein the evaluation of the horizontality time count value is performed by comparing a previously set walk pitch with a horizontality time count value per minute unit of the horizontality time count value.

5. An electronic pedometer according to claim 1, wherein the slant sensor outputs a directional slant signal showing the fact that it has slanted in at least one direction having been optionally selected and, in a case where the slant sensor has outputted the directional slant signal, the signal processing part makes the directional slant signal into the slant signal.

* * * * *